United States Patent
Hirose et al.

(10) Patent No.: US 10,232,361 B2
(45) Date of Patent: Mar. 19, 2019

(54) HONEYCOMB STRUCTURAL BODY AND METHOD FOR MANUFACTURING THE SAME

(71) Applicant: NGK INSULATORS, LTD., Nagoya (JP)

(72) Inventors: Shogo Hirose, Gifu (JP); Hirotaka Yamamoto, Nagoya (JP); Shiori Nakao, Tokai (JP); Shuji Ueda, Nagoya (JP); Mitsuharu Ono, Nagoya (JP); Satoshi Sakashita, Yokkaichi (JP); Hiroyuki Nagaoka, Kakamigahara (JP)

(73) Assignee: NGK Insulators, Ltd., Nagoya (JP)

( * ) Notice: Subject to any disclaimer, the term of this patent is extended or adjusted under 35 U.S.C. 154(b) by 154 days.

(21) Appl. No.: 15/080,907

(22) Filed: Mar. 25, 2016

(65) Prior Publication Data

US 2016/0288113 A1 Oct. 6, 2016

(30) Foreign Application Priority Data

Mar. 30, 2015 (JP) ................................. 2015-069421

(51) Int. Cl.
*B01J 35/04* (2006.01)
*B01J 37/00* (2006.01)
(Continued)

(52) U.S. Cl.
CPC .......... *B01J 35/04* (2013.01); *B01D 53/9418* (2013.01); *B01J 35/10* (2013.01); *B01J 37/0018* (2013.01);
(Continued)

(58) Field of Classification Search
CPC .... B01J 35/04; B01J 37/0246; B01J 53/9418; B01J 37/0018; B01J 20/28045; B01J 2219/32296; B01J 35/10; C04B 38/00009; C04B 38/00006; C04B 38/012; C04B 38/0051; C04B 38/007; C04B 38/0074; C04B 38/0058; C04B 41/00; C04B 38/0009; C04B 38/0006;
(Continued)

(56) References Cited

U.S. PATENT DOCUMENTS 9,827,556 B2 * 11/2017 Nagao .................. B01D 53/945
2006/0192324 A1 8/2006 Kaneda et al.
(Continued)

FOREIGN PATENT DOCUMENTS

JP 2014-198315 A1 10/2014
WO 2005/063360 A1 7/2005
(Continued)

OTHER PUBLICATIONS

Japanese Office Action (with English translation), Japanese Application No. 2015-069421, dated Jul. 17, 2018 (7 pages).

*Primary Examiner* — Michael E. La Villa
(74) *Attorney, Agent, or Firm* — Burr & Brown, PLLC

(57) ABSTRACT

A honeycomb structural body 20 comprises a porous partition portion 22 which forms a plurality of cells each functioning as a flow path of a fluid, and in the partition portion 22, the average pore diameter is 10 to 20 μm, and a wet area rate R (=S/V) which is the rate of a wet area S of pores to a volume V of the partition portion 22 is 0.000239 μm$^{-1}$ or more.

10 Claims, 2 Drawing Sheets

(51) Int. Cl.
  *B01J 37/08*    (2006.01)
  *B01J 37/04*    (2006.01)
  *B32B 3/12*     (2006.01)
  *B32B 37/14*    (2006.01)
  *B01J 37/02*    (2006.01)
  *B01D 53/94*    (2006.01)
  *B01J 35/10*    (2006.01)
  *C04B 38/00*    (2006.01)
  *C04B 35/195*   (2006.01)
  *C04B 35/626*   (2006.01)
  *C04B 35/634*   (2006.01)
  *C04B 111/00*   (2006.01)

(52) U.S. Cl.
  CPC .......... *B01J 37/0246* (2013.01); *B32B 3/12* (2013.01); *B32B 37/146* (2013.01); *C04B 35/195* (2013.01); *C04B 35/6263* (2013.01); *C04B 35/63424* (2013.01); *C04B 38/0009* (2013.01); B01D 2255/1021 (2013.01); B01D 2255/1023 (2013.01); B01D 2255/1025 (2013.01); B01D 2255/20 (2013.01); B01D 2255/2065 (2013.01); B01D 2255/20715 (2013.01); B01D 2255/20723 (2013.01); B01D 2255/30 (2013.01); B01D 2255/50 (2013.01); B01D 2255/9205 (2013.01); B32B 2305/024 (2013.01); C04B 2111/0081 (2013.01); C04B 2235/3217 (2013.01); C04B 2235/3218 (2013.01); C04B 2235/3244 (2013.01); C04B 2235/349 (2013.01); C04B 2235/3418 (2013.01); C04B 2235/5436 (2013.01); C04B 2235/606 (2013.01); C04B 2235/6567 (2013.01)

(58) Field of Classification Search
  CPC ...... C04B 2235/6567; C04B 2235/606; C04B 2235/5436; C04B 2235/349; C04B 2235/3418; C04B 2235/3244; C04B 2235/3218; C04B 2235/3217; C04B 2111/0081; C04B 35/63424; C04B 35/6263; C04B 35/195; C04B 35/185; C04B 35/447; C04B 35/46; C04B 35/478; C04B 35/48; C04B 35/565; C04B 35/584; C04B 35/597; C04B 38/0054; B01D 2255/50; B01D 2255/1021; B01D 2255/1025; B01D 2255/20; B01D 2255/2065; B01D 2255/20715; B01D 2255/20723; B01D 2255/30; B01D 2255/9205; B01D 2201/62; B01D 2253/3425; B01D 39/20; B01D 39/2068; B01D 39/2072; B01D 39/2093; B01D 46/2418; B01D 46/2425; B01D 46/2429; B01D 46/2433; B01D 46/2437; B01D 46/2451; B01D 46/247; B01D 46/2474; B01D 46/2488; B01D 46/2455; B01D 53/9418; B01D 2255/1023; B32B 3/12; B32B 37/146; B32B 2305/024

See application file for complete search history.

(56) References Cited

U.S. PATENT DOCUMENTS

| | | |
|---|---|---|
| 2007/0225149 A1 | 9/2007 | Hayashi et al. |
| 2012/0230881 A1* | 9/2012 | Boger ................ B01D 46/2474 422/187 |
| 2014/0147342 A1* | 5/2014 | Hirose ................ C04B 38/0009 422/180 |
| 2015/0020490 A1 | 1/2015 | Okano et al. |
| 2017/0274354 A1* | 9/2017 | Yamamoto ............ F01N 3/2828 |

FOREIGN PATENT DOCUMENTS

| | | |
|---|---|---|
| WO | 2005/090263 A1 | 9/2005 |
| WO | 2013/146594 A1 | 10/2013 |

* cited by examiner

HONEYCOMB STRUCTURAL BODY AND METHOD FOR MANUFACTURING THE SAME

BACKGROUND OF THE INVENTION

1. Field of the Invention

The present invention relates to a honeycomb structural body and a method for manufacturing the same.

2. Description of the Related Art

Hitherto, as a honeycomb structural body, there has been known a structural body having a porous partition portion which forms a plurality of cells each functioning as a flow path of a fluid (for example, see Patent Literature 1). This honeycomb structural body carries a catalyst on the partition and is used for a purification device purifying an exhaust gas emitted from an automobile.

CITATION LIST

Patent Literature

PTL 1: JP 2014-198315 A

SUMMARY OF THE INVENTION

Incidentally, when a honeycomb structural body is used for a purification device of an exhaust gas, a higher purification performance of purifying an exhaust gas is more preferable. However, when it is aimed to improve the purification performance by increasing a catalyst amount carried on the honeycomb structural body or the like, for example, the flow path is narrowed by the catalyst, and as a result, a problem in that the pressure loss is increased may arise in some cases.

The present invention was made to resolve the problem as described above and primarily aims to provide a honeycomb structural body capable of improving an exhaust gas purification performance while the increase in pressure loss is suppressed.

In order to achieve the primary aim described above, the present invention is as follows.

A honeycomb structural body according to the present invention comprises:

a porous partition portion which forms a plurality of cells each functioning as a flow path of a fluid, and in the partition portion, the average pore diameter is 10 to 20 μm, and a wet area rate R (=S/V) which is the rate of a wet area S of pores to a volume V of the partition portion is 0.000239 $\mu m^{-1}$ or more.

In this honeycomb structural body, since the average pore diameter of the porous partition portion which forms a plurality of cells each functioning as a flow path of a fluid is 10 to 20 μm, and the wet area rate R is 0.000239 $\mu m^{-1}$ or more, in the state in which a catalyst is then carried on the partition portion, the increase in pressure loss can be suppressed, and in addition, a high exhaust gas purification performance can be obtained. In the partition portion which satisfies the above numerical ranges, it is believed that many pores having an appropriate size are formed and are also communicated with each other. As a result, the catalyst is likely to be filled into the pores, and a gas flowing through the flow paths is likely to be diffused into the catalyst and the partition portion; hence, it is believed that the suppression of the increase in pressure loss and a high exhaust gas purification performance can both be achieved. In addition, the honeycomb structural body according to the present invention as described above may be obtained, for example, by a first or a second method for manufacturing a honeycomb structural body according to the present invention which will be described later.

In the honeycomb structural body according to the present invention, the partition portion may have a porosity of 50% to 65%.

The honeycomb structural body according to the present invention may be a honeycomb structural body which carries a catalyst functioning to purify an exhaust gas on the partition portion according to one of the modes described above. This honeycomb structural body can suppress the increase in pressure loss and can also have a high exhaust gas purification performance. In the case described above, a catalyst filling rate which is the rate of a portion on which the catalyst is present to the pores of the partition portion may be 70% or more. When the catalyst filling rate is 70% or more, the effect of suppressing the increase in pressure loss and the exhaust gas purification performance are likely to be improved. In addition, the catalyst may also contain a catalyst component configured to purify at least NOx.

A first method for manufacturing a honeycomb structural body according to the present invention, comprises:

a raw material mixing step of forming a clay-like material by mixing a molding raw material containing 100 percent by mass of a ceramic raw material, 2 percent by mass or more of a water absorptive polymer before water absorption, the average particle diameter of which is 20 μm or more after water absorption, and 0.5 percent by mass or more of zirconia;

a molding step of obtaining a honeycomb molded body by molding the clay-like material into a honeycomb shape; and a firing step of obtaining a honeycomb structural body having a porous partition portion which forms a plurality of cells each functioning as a flow path of a fluid by firing the honeycomb molded body.

According to this first method for manufacturing a honeycomb structural body, in the raw material mixing step, 2 percent by mass or more of the water absorptive polymer before water absorption, the average particle diameter of which is 20 μm or more after water absorption, and 0.5 percent by mass or more of zirconia are contained as the ingredients of the molding raw material. In the state in which the catalyst is then carried on the partition portion, the honeycomb structural body manufactured using the molding raw material as described above can suppress the increase in pressure loss and can also have a high exhaust gas purification performance.

A second method for manufacturing a honeycomb structural body according to the present invention, comprises:

a raw material mixing step of forming a clay-like material by mixing a molding raw material containing 100 percent by mass of a ceramic raw material which contains 14 percent by mass or more of a silica gel, and 2 percent by mass or more of a water absorptive polymer before water absorption, the average particle diameter of which is 20 μm or more after water absorption;

a molding step of obtaining a honeycomb molded body by molding the clay-like material into a honeycomb shape; and a firing step of obtaining a honeycomb structural body having a porous partition portion which forms a plurality of cells each functioning as a flow path of a fluid by firing the honeycomb molded body.

According to this second method for manufacturing a honeycomb structural body, in the raw material mixing step, 100 percent by mass of the ceramic raw material which contains 14 percent by mass or more of the silica gel, and 2 percent by mass or more of the water absorptive polymer before water absorption, the average particle diameter of which is 20 µm or more after water absorption, are contained as the ingredients of the molding raw material. In the state in which the catalyst is then carried on the partition portion, the honeycomb structural body manufactured using the molding raw material as described above can suppress the increase in pressure loss and can also have a high exhaust gas purification performance.

The first and the second methods for manufacturing a honeycomb structural body according to the present invention each may further comprise, after the firing step described above is performed, a catalyst carrying step of carrying a catalyst on the partition portion of the honeycomb structural body. In the honeycomb structural body manufactured as described above, the increase in pressure loss can be suppressed, and in addition, a high exhaust gas purification performance is obtained.

DETAILED DESCRIPTION OF THE INVENTION

Figure 1:
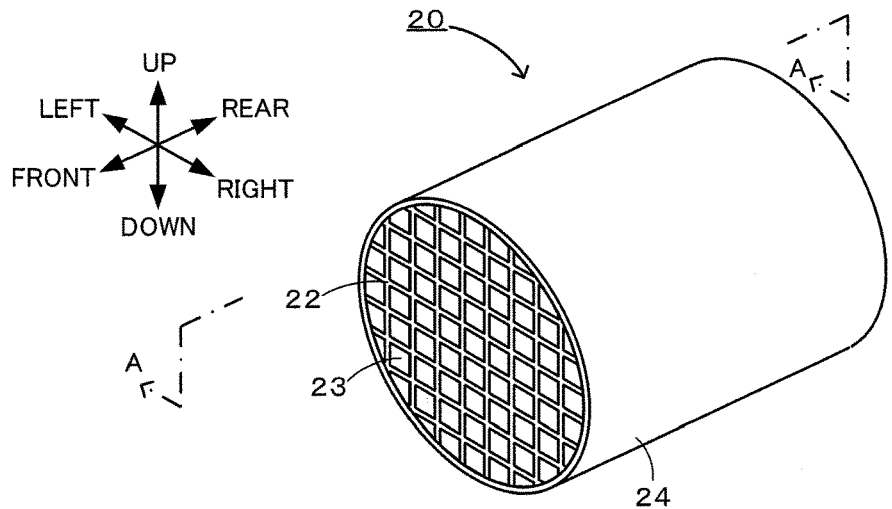
FIG. 1 is a schematic perspective view of a honeycomb structural body 20.
Figure 2:
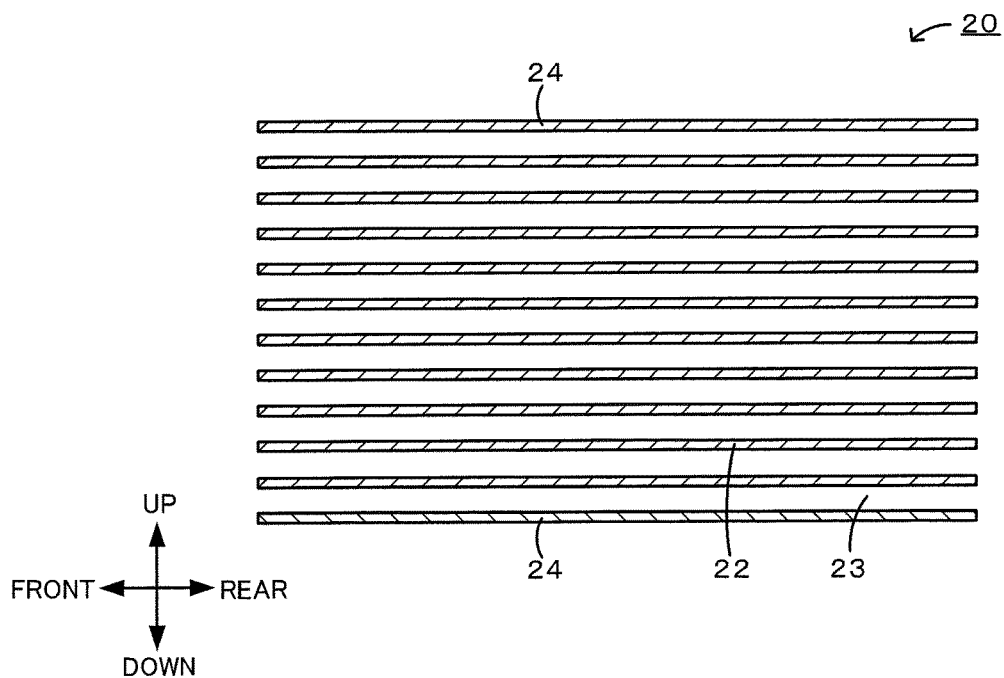
FIG. 2 is a cross-sectional view taken along the line A-A of FIG. 1.

Next, embodiments of the present invention will be described with reference to the drawings. FIG. 1 is a schematic perspective view of a honeycomb structural body 20 according to one embodiment of the present invention. FIG. 2 is a cross-sectional view taken along the line A-A. The honeycomb structural body 20 of the present invention is provided, for example, for an exhaust pipe of an engine as a catalyst carrier carrying a catalyst which purifies an exhaust gas emitted from an automobile engine. In addition, in this embodiment, the up-to-down direction, the front-to-rear direction, and the left-to-right direction are as shown in FIGS. 1 and 2.

This honeycomb structural body 20 includes a porous partition portion 22 which forms a plurality of cells 23 each functioning as a flow path of a fluid and a peripheral portion 24 formed along the periphery of the partition portion 22. This honeycomb structural body 20 has the structure in which the two ends of each cell 23 are opened as shown in FIG. 2.

Although the external shape of this honeycomb structural body 20 is not particularly limited, for example, a cylindrical column, a quadrangular column, an elliptic column, or a hexagonal column may be used. In addition, as the cross-sectional shape of the cell 23, for example, a tetragon, a triangle, a hexagon, an octagon, a circle, or an ellipse may be used. In this embodiment, the external shape of the honeycomb structural body 20 is formed to have a cylindrical column, and the cross-sectional shape of the cell 23 is formed to have a tetragon.

Although not particularly limited, for example, the partition thickness of the partition portion 22 may be set to 0.0635 to 0.46 mm. Although not particularly limited, the cell density of the cells 23 formed by the partition portion 22 may be set, for example, to 5 to less than 187 cells/cm$^2$. The partition portion 22 is a porous ceramic and may be formed, for example, to contain at least one inorganic material selected from cordierite, Si-bonded SiC, recrystallized SiC, aluminum titanate, mullite, silicon nitride, sialon, zirconium phosphate, zirconia, titania, alumina, Cd-bonded SiC, and silica. Among those mentioned above, for example, cordierite, Si-bonded SiC, and recrystallized SiC are preferable.

In the partition portion 22, the average pore diameter is 10 to 20 µm, and the wet area rate R (=S/V) which is the rate of the wet area S of the pores to the volume V of the partition portion 22 is 0.000239 µm$^{-1}$ or more. In addition, in the partition portion 22, the porosity is preferably 50% to 65%. The average pore diameter of the partition portion 22 may be set to 15 µm or more or may be set to 18 µm or less. In addition, the average pore diameter and the porosity are the values each measured by a mercury intrusion method. The average pore diameter, the wet area rate R, and the porosity of the partition portion 22 are the values obtained before the catalyst is carried thereon.

Figure 3:
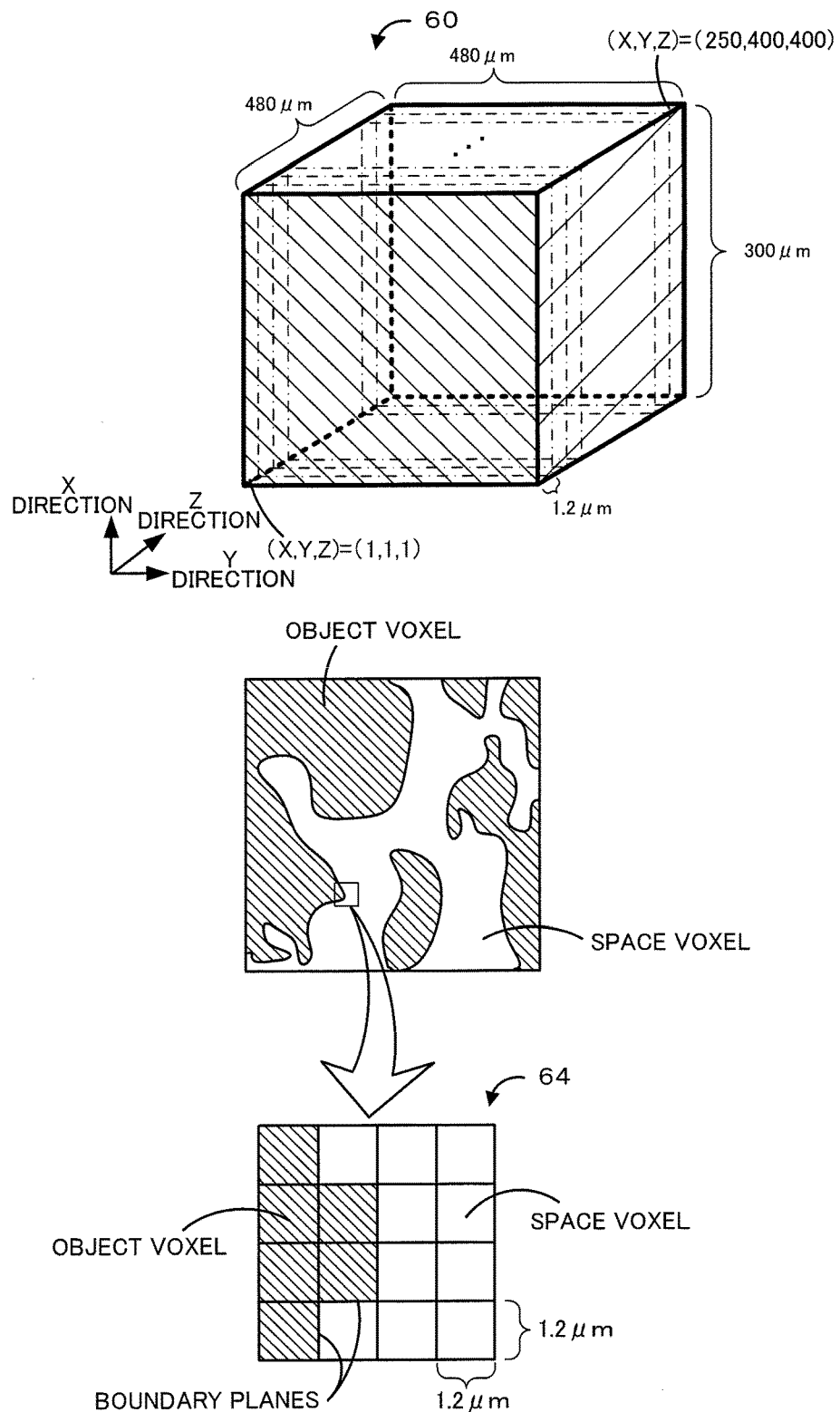
FIG. 3 is a conceptual view of the voxel data 60.

A method for calculating the wet area rate R of the partition portion 22 will be described. The wet area rate R is calculated using a three-dimensional voxel data 60 obtained by performing CT scanning on the partition portion 22. FIG. 3 is a conceptual view of the voxel data 60. First, the partition thickness direction of the partition portion 22 is regarded as an X direction, the axis direction (the front-to-rear direction of each of FIGS. 1 and 2) of the cell 23 is regarded as a Y direction, and an XY plane is regarded as an imaging cross section. Next, the CT scanning is performed on the partition portion 22 for image taking thereof while the imaging cross section is shifted in a Z direction orthogonal to the XY direction so as to obtain a plurality of image data, and based on this image data, the voxel data 60 as shown at the upper portion of FIG. 3 is obtained. The resolution of each of the X, Y, and Z directions is set to 1.2 µm, and a cubic body having a side length of 1.2 µm obtained thereby is the minimum unit of the three-dimensional voxel data 60, that is, is a voxel. In addition, although the image data of the imaging cross section obtained by the CT scanning is a plan data having no thickness in the Z direction, the imaging cross sections are each regarded as an imaging cross section having a thickness equivalent to the interval (1.2 µm) in the Z direction between the imaging cross sections. That is, each two-dimensional pixel of the image data is regarded as a cubic body (voxel) having a side length of 1.2 µm. As shown at the upper portion of FIG. 3, the size of the voxel data 60 is regarded as a rectangular parallelepiped having a length of 300 µm (=1.2 µm×250 voxels) in the X direction, a length of 480 µm (=1.2 µm×400 voxels) in the Y direction, and a length of 480 µm (=1.2 µm×400 voxels) in the Z direction. The position of each voxel is represented by X, Y, Z coordinates (in which one scale unit of the coordinate corresponds to 1.2 µm which is the length of one side of the voxel), and a space voxel representing a space (pore) is distinguished from an object voxel representing an object. The space voxel is distinguished from the object voxel by a binary treatment using a mode method as described below. A plurality of image data actually obtained by the CT scanning is a brightness data of each (X, Y, Z) coordinate. Based on this brightness data, the histogram of brightness of all the coordinates (all pixels of the plurality of image data) is formed. Subsequently, the brightness of the portion (valley) observed between two peaks in the histogram is set as the threshold value, and the brightness of each coordinate is binarized whether being larger or smaller than the threshold value. Accordingly, the voxel of each coordinate is judged whether being a space voxel or an object voxel. At the middle portion of FIG. 3, one example of the state in which space voxels are distinguished from object voxels is shown in a two-dimensional manner. At the lower portion of FIG.

3, an enlarged view 64 of a part of the state described above is shown in a two-dimensional manner. In addition, the CT scanning as described above may be performed, for example, using SMX-160CT-SV3 manufactured by Shimadzu Corporation.

Next, by the use of this voxel data 60, the volume V of the partition portion 22 and the wet area S of the pores are calculated. The volume V is regarded as the volume of all the voxels of the voxel data 60. That is, the volume V is set to 69,120,000 $\mu m^3$ (=300 $\mu m \times 480$ $\mu m \times 480$ $\mu m$). As the wet area S, the total of the boundary planes of the voxel data 60 each between the space voxel and the object voxel is calculated. In more particular, the wet area S is calculated from (the number of boundary planes of the voxel data 60)×(area of one boundary plane). The area of one boundary plane is 1.44 $\mu m^2$ (1.2 $\mu m \times 1.2$ $\mu m$). For example, in the enlarged view 64 shown at the lower portion of FIG. 3, since the number of the boundary planes each present between the space voxel and the object voxel is 6, the total of the areas of the boundary planes in the enlarged view 64 is 6×1.44=8.64 $\mu m^2$. As described above, the wet area S is calculated. Next, from the volume V and the wet area S thus calculated, the wet area rate R (=S/V) [$\mu m^{-1}$] is calculated. In addition, since the volume V is a constant value, the "wet area rate R is 0.000239 $\mu m^2$ or more" can also be said that the "wet area S of the voxel data 60 is 16,500 $\mu m^2$ or more".

Incidentally, although the voxel data 60 used for calculating the wet area rate R is regarded as a data of 300 $\mu m$ in the X direction, 480 $\mu m$ in the Y direction, and 480 $\mu m$ in the Z direction as described above, when the partition thickness of the partition portion 22 is less than 300 $\mu m$, by the use of a voxel data having the same volume V as described above, the wet area rate R is calculated. For example, when the partition thickness is 150 $\mu m$ which is one half of that of the voxel data 60 shown in FIG. 3, by the use of a voxel data in which the length in the Y direction is set to 960 $\mu m$ which is two times the length of the voxel data 60, the wet area rate R is calculated.

The wet area rate R of the partition portion 22 is preferably 0.000264 $\mu m^{-1}$ or more (wet area S: 17,000 $\mu m^2$ or more) and more preferably 0.000253 $\mu m^{-1}$ or more (wet area S: 17,500 $\mu m^2$ or more). In addition, the upper limit of the wet area rate R is not required to be particularly limited. When the numerical range of the average pore diameter described above is satisfied, or the numerical ranges of the average pore diameter and the porosity are satisfied, the upper limit of the wet area rate R is inevitably determined. Although not particularly limited, the wet area rate R may be set, for example, to 0.000300 $\mu m^2$ or less.

The peripheral portion 24 is a wall surrounding the periphery of the honeycomb structural body 20. The peripheral portion 24 may be formed of a material similar to or different from that of the partition portion 22. For example, the peripheral portion 24 is preferably formed of a material containing as a primary component, at least one selected from the group consisting of cordierite, silicon carbide, aluminum oxide, aluminum titanate, mullite, and aluminum nitride. By the use of the material as mentioned above, a honeycomb structural body having an excellent heat resistance is formed.

In addition, a catalyst may be further carried on the partition portion 22 of the honeycomb structural body 20. The type of catalyst is not particularly limited as long as capable of purifying an exhaust gas. The catalyst may also contain a catalyst component purifying, for example, at least one of a hydrocarbon (HC), carbon monoxide (CO), and a nitride oxide (NOx). As the catalyst mentioned above, for example, there may be mentioned a catalyst containing at least one type of element selected from the group consisting of noble metals, such as Pt, Rh, and Pd and at least one type of compound selected from the group consisting of alumina, ceria, and zirconia or a catalyst containing at least one type of material selected from the group consisting of zeolite and vanadium. Although not particularly limited, for example, the catalyst amount carried on the partition portion 22 is 50 to 400 g/L. The catalyst amount is preferably 100 g/L or more and more preferably 150 g/L or more. In addition, the catalyst amount (g/L) indicates the amount (g) of the catalyst carried on the unit volume (1 L) of the honeycomb structural body.

The catalyst carried on the partition portion 22 preferably has a catalyst filling rate of 70% or more, the catalyst filling rate being the rate of a portion on which the catalyst is present to the pores of the partition portion 22. The catalyst filling rate may be 100% or less. Although not particularly limited, the catalyst filling rate may be set to 90% or less. The catalyst filling rate is calculated in such a way that by the use of an observation test piece which is prepared by polishing the partition portion 22 of the honeycomb structural body 20 filled with a resin, observation is performed by a scanning electron microscope (SEM), and the image obtained thereby is then analyzed. First, the observation test piece is prepared which is processed by cutting and polishing so that a cross section orthogonal to the flowing direction (axis direction of the cell 23) of a fluid is to be used as an observation surface. Next, after the magnification of a SEM is set to 100 to 500 times, and the field of view is set in a range of approximately 500 $\mu m \times 500$ $\mu m$, the observation surface of the observation test piece thus prepared is photographed. Subsequently, based on the brightness data of individual pixels of the image thus obtained, the histogram of the brightnesses of all the pixels is formed. In addition, the brightnesses of portions (valleys) observed between three peaks shown in the histogram are set as the threshold values, and the brightness of each pixel is compared with the threshold values, so that the brightness of each pixel is ternarized. As a result, each pixel can be recognized as one of the structural material of the partition portion 22, the catalyst, and the pore. In addition, from the equation of the catalyst filling rate=(number of pixels of catalyst)/(number of pixels of catalyst+number of pixels of pores)×100, the catalyst filling rate is calculated. In addition, the SEM observation as described above may be performed, for example, using S-3200N manufactured by Hitachi High-Technologies Corporation.

Next, a method for manufacturing the honeycomb structural body 20 configured as described above will be described. The honeycomb structural body 20 may be manufactured by one of the following first and second methods for manufacturing a honeycomb structural body 20.

First, the first method for manufacturing a honeycomb structural body 20 will be described. The first method for manufacturing a honeycomb structural body 20 comprises: a raw material mixing step of forming a clay-like material by mixing a molding raw material containing 100 percent by mass of a ceramic raw material, 2 percent by mass or more of a water absorptive polymer before water absorption, the average particle diameter of which is 20 $\mu m$ or more after water absorption, and 0.5 percent by mass or more of zirconia; a molding step of obtaining a honeycomb molded body by molding the clay-like material into a honeycomb shape; and a firing step of obtaining a honeycomb structural body having the porous partition portion 22 which forms a plurality of cells 23 each functioning as a flow path of a fluid by firing the honeycomb molded body.

As the ceramic raw material used in the raw material mixing step, a compound containing at least one inorganic material selected from a cordierite-forming raw material, Si-bonded SiC, recrystallized SiC, aluminum titanate, mullite, silicon nitride, sialon, zirconium phosphate, zirconia, and titania may be mentioned. As the cordierite-forming raw material, for example, kaolin, talc, fired kaolin, alumina, aluminum hydroxide, and silica may be mentioned. As the cordierite-forming raw material, in particular, a compound is preferable which contains at least two inorganic raw materials selected from the group consisting of talc, kaolin, fired kaolin, alumina, aluminum hydroxide, and silica at a rate so as to form the chemical composition of cordierite. In addition, as the silica, for example, at least one of quartz, a silica gel, and fused silica may be used. In the first method for manufacturing a honeycomb structural body 20, as the cordierite-forming raw material, talc, kaolin, fired kaolin, alumina, aluminum hydroxide, and quartz are preferably at least contained.

In the raw material mixing step, at least a water absorptive polymer is used as a pore forming material, and as a firing auxiliary component, at least zirconia is used. The average particle diameter of the water absorptive polymer after water absorption is 20 μm or more. The average particle diameter of the water absorptive polymer after water absorption may be set to 40 μm or less or 30 μm or less. The blending amount of the water absorptive polymer before water absorption is 2 percent by mass or more with respect to 100 percent by mass of the ceramic raw material. The blending amount of the water absorptive polymer before water absorption may be set to 10 percent by mass or less or 6 percent by mass or less. As the water absorptive polymer, for example, a water absorptive resin described in International Publication WO2005/063360 pamphlet may be preferably used. In addition, the average particle diameter of the water absorptive polymer after water absorption is the value measured by a laser diffraction scattering-type particle size distribution meter (LA-920, manufactured by Horiba Ltd.) in the state in which water is only absorbed in the water absorptive polymer.

The blending amount of zirconia used in the raw material mixing step is 0.5 percent by mass or more with respect to 100 percent by mass of the ceramic raw material. The blending amount may be set to 2 percent by mass or less or 1.5 percent by mass or less. The average particle diameter of zirconia is, for example, 0.5 to 4 μm. The average particle diameter is preferably set to 1.5 μm or less.

In the raw material mixing step, a binder, such as a methyl cellulose or a hydroxypropoxyl methyl cellulose, water, and the like may be added, and furthermore, a dispersant may also be added. As the dispersant, a surfactant, such as ethylene glycol, may be used. A method for preparing the clay-like material by mixing the molding raw material is not particularly limited, and for example, a method using a kneader, a vacuum auger machine, or the like may be mentioned.

In the molding step, the clay-like material obtained in the raw material mixing step is molded into a honeycomb molded body which is formed into the honeycomb structural body 20 after firing. A method for forming the honeycomb molded boy is not particularly limited, and for example, a known molding method, such as extrusion molding or injection molding, may be used. For example, extrusion molding may be performed using an extrusion molding die having desired cell shape, partition thickness, and cell density.

In the firing step, by the use of an electric furnace or a gas furnace, the honeycomb molded body is fired to obtain the honeycomb structural body 20. The firing conditions may be appropriately determined in accordance with the type of molding raw material. For example, when a cordierite-forming raw material is used, the firing temperature is preferably 1,350° C. to 1,440° C. In addition, as a time for keeping the maximum temperature, the firing time is preferably 3 to 15 hours. In addition, before the firing step, a drying treatment and a calcination treatment are preferably performed. The drying treatment may be performed by a known method, such as hot wind drying or microwave drying. The calcination treatment is a treatment removing an organic component contained in the honeycomb molded body by firing at a temperature lower than the firing temperature. By the steps as described above, the honeycomb structural body 20 described above may be obtained.

Next, the second method for manufacturing a honeycomb structural body 20 will be described. The second method for manufacturing a honeycomb structural body 20 comprises: a raw material mixing step of forming a clay-like material by mixing a molding raw material containing 100 percent by mass of a ceramic raw material which contains 14 percent by mass or more of a silica gel, and 2 percent by mass or more of a water absorptive polymer before water absorption, the average particle diameter of which is 20 μm or more after water absorption; a molding step of obtaining a honeycomb molded body by molding the clay-like material into a honeycomb shape; and a firing step of obtaining the honeycomb structural body 20 having the porous partition portion 22 which forms a plurality of cells 23 each functioning as a flow path of a fluid by firing the honeycomb molded body.

In the first method for manufacturing a honeycomb structural body 20, in the raw material mixing step, 0.5 percent by mass or more of zirconia is contained as one ingredient of the molding raw material. On the other hand, in the second method for manufacturing honeycomb structural body 20, although zirconia may not be contained as one ingredient of the molding raw material, instead, 14 percent by mass or more of a silica gel is contained in 100 percent by mass of the ceramic raw material. Except that described above, this method may be performed in a manner similar to that of the first method for manufacturing a honeycomb structural body 20. In addition, in the second method for manufacturing a honeycomb structural body 20, as a cordierite-forming raw material, talk, kaolin, alumina, aluminum hydroxide, and a silica gel are preferably at least contained. The blending amount of the silica gel in 100 percent by mass of the ceramic raw material may be set to 23 percent by mass or less or 15 percent by mass or less. The average particle diameter of the silica gel is, for example, 8 to 20 The average particle diameter is preferably set to 10 μm or more. The average particle diameter is preferably set to 18 μm or less. By the second method for manufacturing a honeycomb structural body 20, the honeycomb structural body 20 described above may also be obtained. In addition, the average particle diameter of the silica gel is the value measured using a laser diffraction scattering-type particle size distribution meter (LA-920, manufactured by Horiba Ltd.).

After the firing step is performed, a catalyst carrying step of carrying the catalyst on the partition portion 22 of the honeycomb structural body 20 may be performed on the honeycomb structural body 20 manufactured by one of the first and the second methods for manufacturing a honeycomb structural body 20. A method for carrying the catalyst is not particularly limited, and the carrying may be performed by a known method. For example, first, a catalyst slurry containing a predetermined catalyst is prepared. Next, this catalyst slurry is allowed to flow into the cells 23 from one end surface side of the honeycomb structural body 20. When the catalyst slurry is allowed to flow into the cells, a dipping or a suction method is preferably performed. As the catalyst, the materials mentioned above may be used.

According to the honeycomb structural body 20 of this embodiment described in detail, since the average pore diameter of the porous partition portion 22 which forms a plurality of cells 23 each functioning as a flow path of a fluid is 10 to 20 μm, and the wet area rate R is 0.000239 $\mu m^{-1}$ or more, in the subsequent state in which the catalyst is carried on the partition portion 22, the increased in pressure loss can be suppressed, and in addition, a high exhaust gas purification performance can be obtained. It is believed that in the partition portion 22 which satisfies the numerical ranges described above, many pores each having an appropriate size are formed and are also communicated with each other. As a result, it is believed that since the catalyst is likely to be filled in the pores, and a gas flowing through the flow paths is likely to be diffused into the catalyst and the partition portion 22, the suppression of the increase in pressure loss and a high exhaust gas purification performance can both be satisfied.

In addition, in the state in which the catalyst is carried on the partition portion 22, since the catalyst filling rate, which is the rate of a portion on which the catalyst is present to the pores of the partition portion 22, is 70% or more, the effect of suppressing the increase in pressure loss and the exhaust gas purification performance are likely to be improved.

Furthermore, according to the first method for manufacturing a honeycomb structural body 20 of this embodiment, in the raw material mixing step, 100 percent by mass of the ceramic raw material, 2 percent by mass or more of the water absorptive polymer before water absorption, the average particle diameter of which is 20 μm or more after water absorption, and 0.5 percent by mass or more of zirconia are contained as the ingredients of the molding raw material. By the honeycomb structural body 20 manufactured using the molding raw material as described above, when the catalyst is carried on the partition portion 22 by performing the subsequent catalyst carrying step, the increase in pressure loss can be suppressed, and in addition, a high exhaust gas purification performance can be obtained.

Furthermore, according to the second method for manufacturing a honeycomb structural body 20 of this embodiment, in the raw material mixing step, 100 percent by mass of the ceramic raw material containing 14 percent by mass or more of a silica gel, and 2 percent by mass or more of the water absorptive polymer before water absorption, the average particle diameter of which is 20 μm or more after water absorption are contained as the ingredients of the molding raw material. By the honeycomb structural body 20 manufactured using the molding raw material as described above, when the catalyst is carried on the partition portion 22 by performing the subsequent catalyst carrying step, the increase in pressure loss can be suppressed, and in addition, a high exhaust gas purification performance can be obtained.

In addition, the present invention is not limited at all to the embodiments described above and, of course, may be performed in various modes within the technical scope of the present invention.

For example, in the embodiment described above, although 0.5 percent by mass or more of zirconia is contained as one ingredient of the molding raw material in the first method for manufacturing a honeycomb structural body 20, in the second method for manufacturing a honeycomb structural body 20, zirconia may also be further contained. In addition, in the first method for manufacturing a honeycomb structural body 20, 14 percent by mass or more of a silica gel may also be contained in 100 percent by mass the ceramic raw material.

EXAMPLE

Hereinafter, the cases in each of which the honeycomb structural body was actually formed will be described as examples. However, the present invention is not limited at all to the following examples.

Example 1

A honeycomb structural body of Example 1 was formed as described below. In a raw material mixing step, first, as a ceramic raw material, a cordierite-forming raw material was prepared. In particular, 40 percent by mass of talc having an average particle diameter of 10 μm, 8 percent by mass of kaolin having an average particle diameter of 5 μm, 8 percent by mass of fired kaolin having an average particle diameter of 2 μm, 20 percent by mass of alumina having an average particle diameter of 5 μm, 9 percent by mass of aluminum hydroxide having an average particle diameter of 1 μm, and 15 percent by mass of quartz having an average particle diameter of 4 μm were mixed together to prepare the cordierite-forming raw material. To 100 percent by mass of this cordierite-forming raw material, 6.0 percent by mass of a water absorptive polymer before water absorption, the average particle diameter of which was 20 μm after water absorption, 1.5 percent by mass of zirconia having an average particle diameter 1.0 μm, 5.6 percent by mass of a methyl cellulose and a hydroxypropoxyl methyl cellulose as a binder, 0.5 percent by mass of a surfactant, and 81 percent by mass of water were added to form a molding raw material, and mixing thereof was performed, so that a clay-like material was obtained. In addition, the water absorptive polymer was a granular polyacrylic ammonium salt, the water absorption magnification thereof was 15 to 25 times, and the average particle diameter thereof after water absorption was the same value as that described above (20 μm).

Next, in the molding step, this clay-like material was extrusion molded using a predetermined die, so that a honeycomb molded body was molded which had the shape of a partition portion forming square cells as shown in FIGS. 1 and 2. In addition, a portion forming the peripheral portion was also integrally molded. In addition, the honeycomb molded body thus obtained was dried, and firing was then performed in the firing step. Drying was performed for 10 to 30 minutes by a microwave dryer, and firing was performed for 40 to 60 hours in total in which a maximum temperature of 1,430° C. was maintained for 5 to 15 hours, so that the honeycomb structural body of Example 1 was obtained. The honeycomb structural body was formed to have an end surface diameter of 229 mm and a length of 203 mm, and the cell structure was formed to have 4 mil/600 cpsi.

Examples 2 to 13 and Comparative Examples 1 to 13

Except that the average particle diameter of the molding raw material, the blending rate thereof, and the cell structure were changed as shown in Table 1, honeycomb structural bodies of Examples 2 to 13 and Comparative Examples 1 to 13 were formed in a manner similar to that of Example 1. In addition, [-] in Table 1 indicates the case in which the material was not added as the ingredient of the molding raw material. In addition, in Examples 9 to 11 and 13 and Comparative Example 12, instead of using quartz, a silica gel having an average particle diameter of 12 μm was added at the rate shown in Table 1. In Comparative Example 4, instead of using quartz, fused silica having an average particle diameter 15 μm was added.

[Measurement of Porosity, Average Pore Diameter, and Wet Area Rate R]

The porosity, the average pore diameter, and the wet area rate R of each of Examples 1 to 13 and Comparative Examples 1 to 13 were measured. The porosity and the average pore diameter were measured by a mercury porosimeter (Autopore IV9520, manufactured by Micrometrics). The wet area rate R was measured by the method described above. The results are shown in Table 1. In addition, in Table 1, the value of the wet area S is collectively shown.

[Catalyst Carrying Step]

A catalyst carrying step of carrying a catalyst on the partition portion of the honeycomb structural body of each of Examples 1 to 13 and Comparative Examples 1 to 13 was performed. As the catalyst, ZSM-5 zeolite was used. The catalyst amount (g/L) was as shown in Table 1.

[Measurement of Catalyst Filling Rate]

The catalyst filling rate of each of Examples 1 to 13 and Comparative Examples 1 to 13 was measured by the method described above after the catalyst carrying step was performed. The measurement was performed at 6 points which were the intersections between three imaginary lines which passed through the center and the two ends of the honeycomb structural body in the diameter direction and which extended along the length direction thereof and two imaginary planes which extended orthogonal to the length direction and which passed through the honeycomb structural body at the positions 1 am apart from the inlet surface and 1 cm apart from the outlet surface thereof, and 3 test pieces were sampled from each of the 6 points described above. Based on the photo of each test piece taken by a SEM, the catalyst portion and the pore portion were obtained by the image analysis described above, and the catalyst filling rate=number of pixels of catalyst portions/(number of pixels of catalyst portions+number of pixels of pore portions) was obtained, so that the catalyst filling rate was calculated as the average value of all the test pieces. The results are shown in Table 1. In addition, the magnification used for the SEM observation was set to 200 times.

[Evaluation of Pressure Loss]

After the catalyst carrying step was performed, the honeycomb structural body of each of Examples 1 to 13 and Comparative Examples 1 to 13 was fitted to an exhaust system of a 2.2-L diesel engine at an engine bench, and the pressure loss (kPa) was obtained under the normal conditions at an engine rotation of 2,200 rpm and a torque of 45 NM. The pressure loss was measured by a differential pressure gage after warming up for 30 minutes from the star-up of the engine provided with a test sample, and when the differential pressure between the front and the rear of the test sample was sufficiently stabilized, measurement was performed for 10 seconds, and the average obtained thereby was regarded as the pressure loss. The pressure loss of Comparative Example 1 was regarded as the reference (value: 1.0), and the ratio of the pressure loss of each of Examples 1 to 13 and Comparative Examples 2 to 13 to the pressure loss of Comparative Example 1 was calculated as the pressure loss ratio. In addition, the case in which the pressure loss ratio was 1.2 or less was ranked as good, and the case in which the pressure loss ratio was more than 1.2 was ranked as NG. The results are shown in Table 1.

[Evaluation of NOx Purification Rate]

By the use of a urea SCR system including a diesel engine (8 L/6 cylinders), the NOx purification rate was evaluate. After an exhaust gas and urea required for NOx purification were allowed to flow through the honeycomb structural body of each of Examples 1 to 13 and Comparative Examples 1 to 13, the amounts of NOx at the front stage and the rear stage of the honeycomb structural body were measured, and the NOx purification rate (%) was calculated by (amount of NOx at rear stage)/(amount of NOx at front stage)×100. The NOx purification rate measurement was performed under the conditions in which the exhaust gas temperature at a measurement position 20 mm apart from the inlet end surface of the honeycomb structural body in a forward direction was 250° C., the amount of the exhaust gas was 380 kg/h, and the NOx/NH$_3$ equivalent ratio was 1.0. In addition, the case in which the NOx purification rate was 90% or more was ranked as good, and the case in Which the NOx purification rate was less than 90% was ranked as NG. The results are shown in Table 1.

TABLE 1

| | Molding Raw Material | | | | | | | | |
|---|---|---|---|---|---|---|---|---|---|
| | Cordierite-Forming Raw Material | | | | | | | | |
| | Talc | | Kaolin (Average Particle Diameter of 5 μm) (Parts by Mass) (%) | Fired Kaolin (Average Particle Diameter of 2 μm) (Parts by Mass) (%) | Alumina (Average Particle Diameter of 5 μm) (Parts by Mass) (%) | Aluminum Hydroxide (Average Particle Diameter of 1 μm) (Parts by Mass) (%) | Quartz (Average Particle Diameter of 4 μm) (Parts by Mass) (%) | Fused Silica (Average Particle Diameter of 15 μm) (Parts by Mass) (%) | Silica Gel (Average Particle Diameter of 12 μm) (Parts by Mass) (%) |
| | Average Particle Diameter (μm) | (Parts by Mass) (%) | | | | | | | |
| Experimental Example 1 | 10 | 40 | 8 | 8 | 20 | 9 | 15 | — | — |
| Experimental Example 2 | 10 | 40 | 8 | 8 | 20 | 9 | 15 | — | — |
| Experimental Example 3 | 10 | 40 | 8 | 8 | 20 | 9 | 15 | — | — |
| Experimental Example 4 | 10 | 40 | 8 | 8 | 20 | 9 | 15 | — | — |
| Experimental | 10 | 40 | 8 | 8 | 20 | 9 | 15 | — | — |

TABLE 1-continued

| | | | | | | | | | |
|---|---|---|---|---|---|---|---|---|---|
| Example 5 | | | | | | | | | |
| Experimental Example 6 | 10 | 40 | 8 | 8 | 20 | 9 | 15 | — | — |
| Experimental Example 7 | 10 | 40 | 8 | 8 | 20 | 9 | 15 | — | — |
| Experimental Example 8 | 10 | 40 | 8 | 8 | 20 | 9 | 15 | — | — |
| Experimental Example 9 | 10 | 39 | 18 | — | 14 | 15 | — | — | 14 |
| Experimental Example 10 | 10 | 39 | 18 | — | 14 | 15 | — | — | 14 |
| Experimental Example 11 | 10 | 39 | 18 | — | 14 | 15 | — | — | 14 |
| Experimental Example 12 | 10 | 40 | 8 | 8 | 20 | 9 | 15 | — | — |
| Experimental Example 13 | 10 | 39 | 18 | — | 14 | 15 | — | — | 14 |
| Comparative Example 1 | 10 | 40 | 15 | 28 | 12 | 5 | — | — | — |
| Comparative Example 2 | 10 | 40 | 15 | 28 | 12 | 5 | — | — | — |
| Comparative Example 3 | 10 | 40 | 15 | 28 | 12 | 5 | — | — | — |
| Comparative Example 4 | 25 | 40 | 18.5 | — | 14 | 15 | — | 12.5 | — |
| Comparative Example 5 | 10 | 40 | 15 | 28 | 12 | 5 | — | — | — |
| Comparative Example 6 | 10 | 40 | 8 | 8 | 20 | 9 | 15 | — | — |
| Comparative Example 7 | 10 | 40 | 8 | 8 | 20 | 9 | 15 | — | — |
| Comparative Example 8 | 10 | 40 | 8 | 8 | 20 | 9 | 15 | — | — |
| Comparative Example 9 | 10 | 40 | 8 | 8 | 20 | 9 | 15 | — | — |
| Comparative Example 10 | 10 | 40 | 8 | 8 | 20 | 9 | 15 | — | — |
| Comparative Example 11 | 10 | 40 | 8 | 8 | 20 | 9 | 15 | — | — |
| Comparative Example 12 | 10 | 39 | 18 | — | 14 | 15 | — | — | 14 |
| Comparative Example 13 | 10 | 40 | 8 | 8 | 20 | 9 | 15 | — | — |

| | Molding Raw Material | | | | | | | | |
|---|---|---|---|---|---|---|---|---|---|
| | Water Absorptive Polymer | | Zirconia (Average Particle Diameter of 1.0 μm) (Parts by Mass) (%) | Binder (Parts by Mass) (%) | Surfactant (Parts by Mass) (%) | Water (Parts by Mass) (%) | Cell Structure | Porosity (%) | Average Pore Diameter (μm) |
| | Average Particle Diameter (μm) | (Parts by Mass) (%) | | | | | | | |
| Experimental Example 1 | 20 | 6.0 | 1.5 | 5.6 | 0.5 | 81 | 4/600 | 63 | 20 |
| Experimental Example 2 | 20 | 6.0 | 1.0 | 5.6 | 0.5 | 80 | 4/600 | 63 | 18 |
| Experimental Example 3 | 20 | 6.0 | 0.5 | 5.6 | 0.5 | 80 | 4/600 | 63 | 16 |
| Experimental Example 4 | 20 | 4.3 | 1.5 | 5.6 | 0.5 | 67 | 4/600 | 60 | 16 |
| Experimental Example 5 | 20 | 4.3 | 0.5 | 5.6 | 0.5 | 66 | 4/600 | 60 | 13 |
| Experimental Example 6 | 20 | 2.1 | 1.5 | 5.6 | 0.5 | 57 | 4/600 | 51 | 17 |
| Experimental Example 7 | 20 | 2.1 | 1.0 | 5.6 | 0.5 | 56 | 4/600 | 53 | 16 |
| Experimental Example 8 | 20 | 2.1 | 0.5 | 5.6 | 0.5 | 55 | 4/600 | 51 | 15 |
| Experimental Example 9 | 20 | 6.0 | — | 5.6 | 0.5 | 105 | 4/600 | 64 | 18 |
| Experimental Example 10 | 20 | 4.0 | — | 5.6 | 0.5 | 85 | 4/600 | 60 | 16 |
| Experimental Example 11 | 20 | 2.0 | — | 5.6 | 0.5 | 65 | 4/600 | 55 | 11 |
| Experimental Example 12 | 20 | 4.3 | 0.5 | 5.6 | 0.5 | 66 | 4/600 | 60 | 12 |
| Experimental Example 13 | 20 | 4.0 | — | 5.6 | 0.5 | 85 | 4/600 | 60 | 11 |

TABLE 1-continued

| | | | | | | | | | |
|---|---|---|---|---|---|---|---|---|---|
| Example 13 | | | | | | | | | |
| Comparative Example 1 | — | — | — | 5.6 | 0.5 | 35 | 4/400 | 35 | 4 |
| Comparative Example 2 | 100 | 2.5 | — | 5.6 | 0.5 | 60 | 5/400 | 50 | 21 |
| Comparative Example 3 | 100 | 2.5 | — | 5.6 | 0.5 | 60 | 4/600 | 50 | 23 |
| Comparative Example 4 | 20 | 2.5 | — | 5.6 | 0.5 | 46 | 4/600 | 50 | 9 |
| Comparative Example 5 | 130 | 2.5 | — | 5.6 | 0.5 | 60 | 4/600 | 50 | 23 |
| Comparative Example 6 | 20 | 4.3 | — | 5.6 | 0.5 | 65 | 4/600 | 62 | 9 |
| Comparative Example 7 | 20 | 2.1 | — | 5.6 | 0.5 | 55 | 4/600 | 50 | 8 |
| Comparative Example 8 | — | — | 1.5 | 5.6 | 0.5 | 35 | 4/600 | 42 | 9 |
| Comparative Example 9 | — | — | 1.0 | 5.6 | 0.5 | 34 | 4/600 | 41 | 8 |
| Comparative Example 10 | — | — | 0.5 | 5.6 | 0.5 | 34 | 4/600 | 41 | 8 |
| Comparative Example 11 | — | — | — | 5.6 | 0.5 | 34 | 4/600 | 42 | 5 |
| Comparative Example 12 | — | — | — | 5.6 | 0.5 | 45 | 4/600 | 51 | 8 |
| Comparative Example 13 | 20 | 6.0 | — | 5.6 | 0.5 | 79 | 4/600 | 64 | 8 |

| | Wet Area S (μm²) | Wet Area Rate R (μm⁻¹) | Catalyst Amount (g/L) | Catalyst Filling Rate (%) | Evaluation Test | | | |
|---|---|---|---|---|---|---|---|---|
| | | | | | Pressure Loss Ratio | | NOx Purification Rate (%) | |
| | | | | | Value | Evaluation | Value | Evaluation |
| Experimental Example 1 | 17321 | 0.0002506 | 300 | 82 | 1.10 | Good | 95 | Good |
| Experimental Example 2 | 17612 | 0.0002548 | 300 | 83 | 1.12 | Good | 94 | Good |
| Experimental Example 3 | 17777 | 0.0002572 | 300 | 79 | 1.12 | Good | 96 | Good |
| Experimental Example 4 | 16599 | 0.0002401 | 300 | 83 | 1.15 | Good | 92 | Good |
| Experimental Example 5 | 16721 | 0.0002419 | 300 | 83 | 1.14 | Good | 92 | Good |
| Experimental Example 6 | 16700 | 0.0002416 | 300 | 76 | 1.16 | Good | 92 | Good |
| Experimental Example 7 | 16750 | 0.0002423 | 300 | 75 | 1.17 | Good | 93 | Good |
| Experimental Example 8 | 16521 | 0.0002390 | 300 | 74 | 1.16 | Good | 93 | Good |
| Experimental Example 9 | 17298 | 0.0002503 | 300 | 78 | 1.12 | Good | 94 | Good |
| Experimental Example 10 | 16741 | 0.0002422 | 300 | 75 | 1.18 | Good | 92 | Good |
| Experimental Example 11 | 16542 | 0.0002393 | 300 | 71 | 1.19 | Good | 91 | Good |
| Experimental Example 12 | 16721 | 0.0002419 | 300 | 62 | 1.20 | Good | 92 | Good |
| Experimental Example 13 | 16741 | 0.0002422 | 300 | 61 | 1.20 | Good | 92 | Good |
| Comparative Example 1 | 12500 | 0.0001808 | 200 | 7 | 1.00 | Good | 80 | NG |
| Comparative Example 2 | 15700 | 0.0002271 | 302 | 69 | 1.01 | Good | 85 | NG |
| Comparative Example 3 | 14100 | 0.0002040 | 298 | 68 | 1.30 | NG | 87 | NG |
| Comparative Example 4 | 17000 | 0.0002459 | 301 | 52 | 1.29 | NG | 91 | Good |
| Comparative Example 5 | 15500 | 0.0002242 | 302 | 70 | 1.32 | NG | 85 | NG |
| Comparative Example 6 | 16815 | 0.0002433 | 300 | 83 | 1.23 | NG | 91 | Good |
| Comparative Example 7 | 16294 | 0.0002357 | 300 | 75 | 1.29 | NG | 92 | Good |
| Comparative Example 8 | 14756 | 0.0002135 | 300 | 62 | 1.38 | NG | 85 | NG |
| Comparative | 14815 | 0.0002143 | 300 | 62 | 1.37 | NG | 81 | NG |

TABLE 1-continued

| | | | | | | | | |
|---|---|---|---|---|---|---|---|---|
| Example 9 Comparative Example 10 | 14826 | 0.0002145 | 300 | 62 | 1.36 | NG | 83 | NG |
| Comparative Example 11 | 14975 | 0.0002167 | 300 | 61 | 1.38 | NG | 82 | NG |
| Comparative Example 12 | 16433 | 0.0002377 | 300 | 60 | 1.40 | NG | 87 | NG |
| Comparative Example 13 | 16200 | 0.0002344 | 300 | 81 | 1.10 | Good | 88 | NG |

As apparent from Table 1, in Examples 1 to 8 and 12 in each of which the molding raw material containing 100 percent by mass of the ceramic raw material, 2 percent by mass or more of the water absorptive polymer before water absorption, the average particle diameter of which is 20 μm or more after water absorption, and 0.5 percent by mass or more of zirconia was used, and in Examples 9 to 11 and 13 in each of which the molding raw material containing 100 percent by mass of the ceramic raw material which contains 14 percent by mass or more of a silica gel and 2 percent by mass or more of the water absorptive polymer before water absorption, the average particle diameter of which is 20 μm or more after water absorption, was used, the average pore diameter of the partition portion was 10 to 20 μm, and the wet area rate R was 0.000239 μm$^{-1}$ or more. In addition, in each of Examples 1 to 13, the porosity was 50% to 65%. In addition, in each of Examples 1 to 13, the pressure loss ratio was 1.2 or less, and the NOx purification rate was 90% or more; hence, the increase in pressure loss was suppressed, and in addition, the exhaust gas purification performance was high. In Comparative Examples 1 to 13, a pressure loss ratio of 1.2 or less and a NOx purification rate of 90% or more could not be simultaneously satisfied. In addition, compared to Examples 12 and 13 in which the catalyst filling rate was less than 70%, in Examples 1 to 11 in which the catalyst filling rate was 70% or more, the increase in pressure loss tended to be suppressed, and in addition, the exhaust gas purification performance tended to be improved.

The present application claims priority from Japanese Patent Application No. 2015-069421 filed on Mar. 30, 2015, the entire contents of which are incorporated herein by reference.

What is claimed is:

1. A honeycomb structural body comprising:
   a porous partition portion that defines a plurality of cells each functioning as a flow path of a fluid,
   wherein in the partition portion, an average pore diameter is 10 to 20 μm, and a wet area rate R (=S/V) which is the rate of a wet area S of pores to a volume V of the partition portion is 0.000239 μm$^{-1}$ or more.

2. A honeycomb structural body comprising the honeycomb structural body of claim 1 and a catalyst functioning to purify an exhaust gas.

3. The honeycomb structural body according to claim 2, wherein a catalyst filling rate which is the rate of a portion on which the catalyst is present to the pores of the partition portion is 70% or more.

4. The honeycomb structural body according to claim 1, wherein the partition portion has a porosity of 50% to 65%.

5. A honeycomb structural body comprising the honeycomb structural body of claim 4 and a catalyst functioning to purify an exhaust gas.

6. The honeycomb structural body according to claim 5, wherein a catalyst filling rate which is the rate of a portion on which the catalyst is present to the pores of the partition portion is 70% or more.

7. A method for manufacturing a honeycomb structural body comprising:
   a raw material mixing step of forming a clay-like material by mixing a molding raw material containing 100 percent by mass of a ceramic raw material, 2 percent by mass or more of a water absorptive polymer before water absorption, the average particle diameter of which is 20 μm or more after water absorption, and 0.5 percent by mass or more of zirconia;
   a molding step of obtaining a honeycomb molded body by molding the clay-like material into a honeycomb shape; and
   a firing step of obtaining a honeycomb structural body having a porous partition portion which forms a plurality of cells each functioning as a flow path of a fluid by firing the honeycomb molded body,
   wherein in the partition portion, an average pore diameter is 10 to 20 μm, and a wet area rate R (=S/V) which is the rate of a wet area S of pores to a volume V of the partition portion is 0.000239 μm$^{-1}$ or more.

8. The method for manufacturing a honeycomb structural body according to claim 7, further comprising:
   after the firing step is performed, a catalyst carrying step of carrying a catalyst on the partition portion of the honeycomb structural body.

9. A method for manufacturing a honeycomb structural body comprising:
   a raw material mixing step of forming a clay-like material by mixing a molding raw material containing 100 percent by mass of a ceramic raw material which contains 14 percent by mass or more of a silica gel, and 2 percent by mass or more of a water absorptive polymer before water absorption, the average particle diameter of which is 20 μm or more after water absorption;
   a molding step of obtaining a honeycomb molded body by molding the clay-like material into a honeycomb shape; and
   a firing step of obtaining a honeycomb structural body having a porous partition portion which forms a plurality of cells each functioning as a flow path of a fluid by firing the honeycomb molded body,
   wherein in the partition portion, an average pore diameter is 10 to 20 μm, and a wet area rate R (=S/V) which is the rate of a wet area S of pores to a volume V of the partition portion is 0.000239 μm$^{-1}$ or more.

10. The method for manufacturing a honeycomb structural body according to claim 9, further comprising:
   after the firing step is performed, a catalyst carrying step of carrying a catalyst on the partition portion of the honeycomb structural body.

* * * * *